W. R. EXLINE.
TONGUE TRUCK.
APPLICATION FILED FEB. 13, 1909.

921,817.

Patented May 18, 1909.

Witnesses

Inventor
William R. Exline.
By C. A. Snow & Co.
Attorneys

UNITED STATES PATENT OFFICE.

WILLIAM R. EXLINE, OF MILLWOOD, WEST VIRGINIA.

TONGUE-TRUCK.

No. 921,817.     Specification of Letters Patent.     Patented May 18, 1909.

Application filed February 13, 1909. Serial No. 477,775.

*To all whom it may concern:*

Be it known that I, WILLIAM R. EXLINE, a citizen of the United States, residing at Millwood, in the county of Jackson and State of West Virginia, have invented a new and useful Tongue-Truck, of which the following is a specification.

The objects of the invention are, generally, the provision in a merchantable form, of a device of the above mentioned class which shall be inexpensive to manufacture, facile in operation, and devoid of complicated parts; specifically, the provision of a tongue truck having tongue-receiving elements of novel and improved construction, and of novel means for assembling the tongue-receiving elements with each other and with the wheeled member by which they are carried; other and further objects being made manifest hereinafter as the description of the invention progresses.

The invention consists in the novel construction and arrangement of parts, hereinafter described, delineated in the accompanying drawings, and particularly pointed out in that portion of this instrument wherein patentable novelty is claimed for certain distinctive and peculiar features of the device, it being understood that within the scope of what hereinafter is thus claimed, divers changes in the form, proportions, size and minor details of the structure may be made without departing from the spirit or sacrificing any of the advantages of the invention.

Similar numerals of reference are employed to denote corresponding parts throughout the several figures of the drawings.

Figure 1:
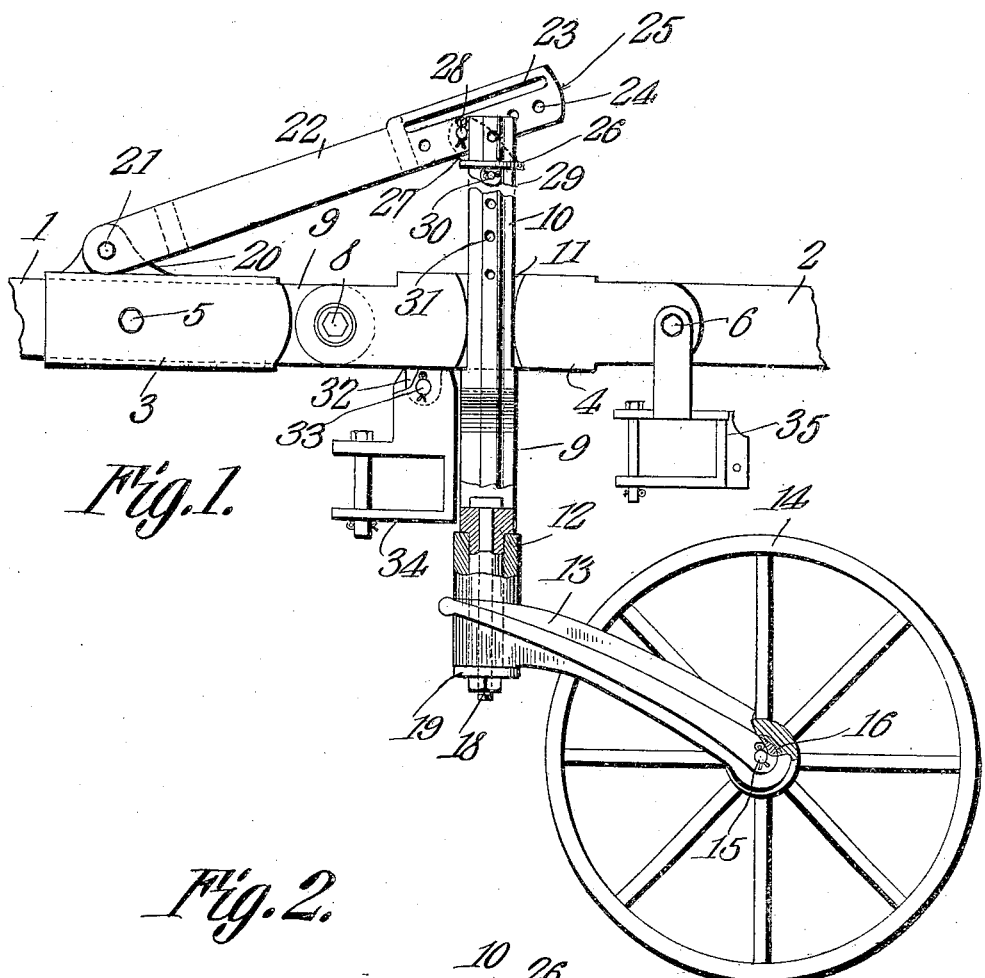
Figure 2:
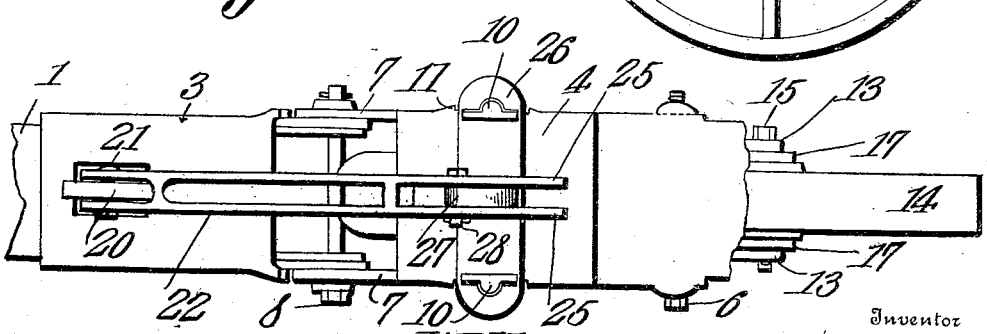

In the accompanying drawings:—Figure 1 shows my invention in side elevation; and Fig. 2 is a top plan thereof.

The improved tongue truck forming the subject matter of this application for Letters Patent is designed to be used in connection with mowers, reapers and binders, and other agricultural implements of a heavy and cumbersome nature, the use of which ordinarily throws a considerably amount of weight upon the horses. In the accompanying drawings I have shown a tongue support adapted to be used in connection with the aforementioned implements or others of a like character, the tongue being divided into two parts to form a forward section 1 and a rearward section 2.

In carrying out my invention I provide a forward tongue socket 3 designed to receive the forward section 1 of the tongue, and a rear tongue socket 4 designed to receive the rear section 2 of the tongue. A bolt 5 passing transversely through the forward tongue socket 3 serves to retain the forward section 1 of the tongue, the rear section 2 thereof being retained in the rear socket 4 by a transversely disposed bolt 6. The adjacent ends of the sockets 3 and 4 are extended to form overlapping arms 7 pivotally united by a transversely disposed member 8. I further provide a standard comprising a shank 9 having bifurcating arms 10 between which is mounted the rear tongue socket 4, the said socket substantially filling the space between the arms and being provided upon its sides with slots 11 to receive the said arms. In Fig. 1 a bearing 12 is clearly shown in abutment with the lower terminal of the shank 9. This bearing 12 is provided with a tubular bore designed to receive the lower terminal of the shank 9 which preferably is reduced in diameter and extended downward through the central bore of the bearing 12 to the lower face thereof. A washer 19 is mounted upon the lower face of the bearing 12 and through this washer and through the shank 9 passes a bolt 18, whereby the bearing may be assembled with the shank 9. The bearing 12 which is journaled for rotation upon the lower terminal of the shank 9 carries arms 13 between the terminals of which is journaled for rotation upon an axle 15 a wheel 14. The axle 15 is surrounded by a bushing 16, and washers 17 may be interposed between the terminals of the axle of the wheel 14 and the arms 13.

The forward tongue socket is provided with an upstanding ear 20 through which passes transversely a pivot member 21. Mounted upon the member 21 is a tongue support 22 comprising parallel members 25 spaced apart and arranged to include between them the ear 20. The tongue support 22 is provided at its rear terminal and near its upper edge with a longitudinally disposed slot 23 and beneath this slot 23 are disposed a series of apertures 24.

A cap 26 is provided having apertures to receive the bifurcating arms 10 of the standard, and this cap 26 has upon its upper surface a forwardly projecting ear 27 designed to register between the parallel members 25 of the tongue support 22. This ear 27 has an aperture designed to receive a bolt 28 arranged to register successively in the apertures 24 of the tongue support and to register in the longitudinally disposed slot 23 thereof, it being understood that the tongue support 22 is reversibly mounted upon the forward tongue support 3 to bring the slot 23 downward. The lower face of the cap 26 carries a bearing 29 designed to receive a bolt 30 or like element which may be mounted successively in the apertures 31 in the arms 10, whereby the cap will be held in position upon said arms.

Depending from the lower face of the rear tongue socket is a bearing 32 designed to receive a bolt 33 upon which is mounted a clevis member 34, a similar clevis member 35 being mounted upon the bolt 6, the said members 34 and 35 furnishing means for the attachment of suitable draft rigging.

It will be seen that the tongue support 22 serves to carry the weight of the forward section 1 of the tongue, the weight of the said tongue passing downward into the wheel 14, whereby the draft animal will be left free from its burden. If desired, as hereinbefore mentioned, the element 22 may be reversed from the position shown in Fig. 1 to bring the slotted edge downward. The bolt 28 will then reciprocate in the slot 23, the forward tongue section 1 having a slight pivotal movement in a vertical plane, a desirable condition when the ground is broken and undulating. The apertures 24 in the tongue support 22 furnish a means whereby the angle of the forward section 1 of the tongue may be regulated, and the scope of this adjustment is further enlarged by the fact that the cap 26 may be moved into successive positions upon the arms 10 of the standard.

Having thus described my invention, what I claim as new and desire to protect by Letters Patent is:—

1. A tongue truck comprising a standard having bifurcating arms; a wheel pivotally carried by the standard; a rear tongue socket mounted between the arms; a forward tongue socket pivoted to the rear tongue socket; a cap adjustably mounted on the arms; and a tongue support having its forward end pivoted to the forward tongue socket, its rear end being adjustably connected with the cap.

2. A tongue truck comprising a standard; a wheel pivotally carried by the standard; a rear tongue socket mounted upon the standard; a forward tongue socket pivoted to the rear tongue socket; a tongue support pivoted to the forward tongue socket and being arranged for rigid and for sliding connection, interchangeably, with the standard.

3. A tongue truck comprising a standard; a wheel pivotally carried by the lower terminal of the standard; a rear tongue socket mounted upon the standard; a forward tongue socket pivoted to the rear tongue socket; a tongue support pivoted at its forward terminal to the forward tongue socket and being provided at its rear terminal with a longitudinal slot and with apertures spaced apart; and a retaining element carried by the standard and being arranged to register successively in the slot of the tongue support and in the apertures therein.

4. A tongue truck comprising a standard having bifurcating arms each being provided with alined apertures; a cap to engage the arms, the said cap having an ear upon its upper surface and being provided upon its lower surface with a bearing; a connecting element arranged to register successively in the apertures of the arm and to register in the bearing; a wheel pivotally carried by the standard; a rear tongue socket mounted between the arms; a forward tongue socket pivoted to the rear tongue socket; and a tongue support having its forward end pivotally mounted upon the forward tongue socket, its rear end being arranged for adjustable connection with the ear.

In testimony that I claim the foregoing as my own, I have hereto affixed my signature in the presence of two witnesses.

WILLIAM R. EXLINE.

Witnesses:
HIRAM SMITH,
BOB WOOMER.